United States Patent [19]
Lee et al.

[11] Patent Number: 5,965,300
[45] Date of Patent: Oct. 12, 1999

[54] POLYMER SOLID ELECTROLYTE, METHOD FOR MANUFACTURING POLYMER SOLID ELECTROLYTE, AND LITHIUM SECONDARY CELL ADOPTING POLYMER SOLID ELECTROLYTE

[75] Inventors: Doo-yeon Lee, Uiwang; Sang-hyun Seong; Hyung-bok Lee, both of Seoul, all of Rep. of Korea

[73] Assignee: Samsung Electroonics Co., Ltd., Kyungki-do, Rep. of Korea

[21] Appl. No.: 08/921,279

[22] Filed: Aug. 29, 1997

[30] Foreign Application Priority Data

Apr. 10, 1997 [KR] Rep. of Korea ............ 97-13286
Jul. 3, 1997 [KR] Rep. of Korea ............ 97-30816

[51] Int. Cl.$^6$ .................................................. H01M 10/08
[52] U.S. Cl. ..................... 429/314; 429/317; 429/322; 429/324
[58] Field of Search ................... 429/314, 316, 429/322, 324

[56] References Cited

U.S. PATENT DOCUMENTS

| | | | |
|---|---|---|---|
| 5,223,353 | 6/1993 | Ohsawa et al. | 429/192 |
| 5,415,958 | 5/1995 | Takahashi et al. | 429/217 |
| 5,589,297 | 12/1996 | Koga et al. | 429/212 |
| 5,776,637 | 7/1998 | Kashio et al. | 429/217 |

*Primary Examiner*—Maria Nuzzelille
*Assistant Examiner*—Angela J. Martin
*Attorney, Agent, or Firm*—Foley & Lardner

[57] ABSTRACT

A polymer solid electrolyte, a method for manufacturing the polymer solid electrolyte, and a lithium secondary cell adopting the polymer solid electrolyte are provided. The polymer solid electrolyte includes a polymer electrolyte medium, at least one vinylidene fluoride resin and/or at least one N,N-diethylacrylamide. The polymer solid electrolyte provides excellent ion conductivity and mechanical strength.

24 Claims, No Drawings

POLYMER SOLID ELECTROLYTE, METHOD FOR MANUFACTURING POLYMER SOLID ELECTROLYTE, AND LITHIUM SECONDARY CELL ADOPTING POLYMER SOLID ELECTROLYTE

BACKGROUND OF THE INVENTION

1. Field of the Invention

The present invention relates to a secondary cell, and more particularly, to a gel type polymer solid electrolyte, a method for manufacturing the polymer solid electrolyte, and a lithium secondary cell adopting the polymer solid electrolyte.

2. Description of Related Art

As portable electronic devices having high degree functions such as camcorders, cellular phones, laptops, etc. become smaller and lighter, research has been conducted to develop a storage cell having high energy density that can be used as a driving source for these devices. In particular, a lithium secondary cell has high energy density per weight, as much as three times that of a conventional lead storage cell, nickel-hydrogen cell or nickel-zinc cell, as well as having the capability of being rapidly recharged. Consequently, significant research has been conducted to develop a lithium secondary cell for use in such products.

As an cathode active material for the lithium secondary cell, lithium cobalt oxide ($LiCoO_2$), lithium nickel oxide ($LiNiO_2$) or lithium manganese oxide ($LiMn_2O_4$) typically are used. Also, as a anode active material, lithium metal, a lithium metal alloy or carbon typically is used.

In addition, a liquid electrolyte generally is used as an electrolyte for the lithium secondary cell. However, if a cell adopting the liquid electrolyte is used for an electric device, the device may be damaged due to leakage of electrolyte solution and the inside of the cell may become dry due to volatilization of solvent. Accordingly, shorts can occur between electrodes. In order to solve these problems, usage of solid electrolyte instead of the liquid electrolyte has been proposed. Generally, solid electrolytes do not leak electrolyte solution and are easily processed. Thus, research into the use of solid electrolytes has been actively performed. There is a particularly high interest in a polymer solid electrolyte. Polymer solid electrolytes can be classified into: (i) a solid type without an organic electrolyte solution; and (ii) a gel type including organic electrolyte solution.

Known polymer solid electrolyte typically include a polymer solid electrolyte produced by combining an alkyleneoxide polymer having the end modified with an acryloyl group, a low molecular weight alkyleneoxide polymer whose both ends are alkyleterified, polyvinyl chloride and electrolyte salt, and a polymer solid electrolyte produced by combining an alkylenoxide polymer having the ends modified with acryloyl group, inorganic ion salt and organic solvent such as propylene carbonate. However, these polymer solid electrolytes are disadvantageous in electrochemical properties, particular, in ion conductivities, and in a mechanical strength.

Other well known polymer solid electrolytes include a polymer solid electrolyte containing polyvinylidene fluoride (PVDF) as a polymer matrix, lithium perchlorate ($LiClO_4$) as a support electrolyte and a propylene carbonate as a solvent. However, the electrolyte has insufficient conductivity of $10^{-5} \sim 10^{-3}$ S/cm at room temperature, so that it is difficult to apply the electrolyte to a cell for practical use.

SUMMARY OF THE INVENTION

Thus, there exists a need to develop a polymeric solid electrolyte which does not suffer from the aforementioned difficulties. It is therefore an object of the present invention to provide a polymer solid electrolyte having excellent ion conductivity and mechanical strength without leakage of electrolyte solution. It is an additional object of the present invention to provide a method for manufacturing the polymer solid electrolyte. It is still another object of the present invention to provide a lithium secondary cell adopting the polymer solid electrolyte.

In accordance with these and other objects of the present invention, there is provided a polymer solid electrolyte comprising a polymer electrolyte medium having a polymer matrix, a polymerization initiator and an electrolyte solution, and vinylidene fluoride resins and/or N,N-diethylacrylamide.

The polymer electrolyte medium has a polymer matrix composed of a copolymer of a polymerizable monomer expressed by the formula (1) and crosslinking agent expressed by the formula (2)

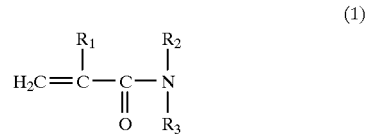

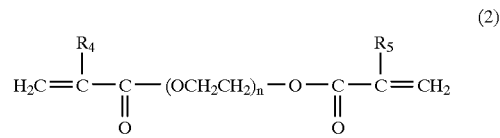

where $R_1$ is hydrogen or methyl group, and $R_2$ and $R_3$ are each independently one selected from the group consisting of hydrogen, methyl, ethyl, propyl, dialkylaminopropyl ($—C_3H_6N(R')_2$) and hydroxyethyl ($CH_2CH_2OH$) groups, and $R_4$ and $R_5$ are each independently hydrogen or methyl group, and n is an integer from 3 to 30, wherein R' is $C_1\sim C_5$ alkyl group.

In accordance with an additional object of the invention, there is provided a method for manufacturing a polymer solid electrolyte comprising the steps of:

(a) mixing a polymerizable monomer expressed by the formula (1), a cross-linking agent expressed by the formula (2), a polymerization initiator and an electrolyte solution containing an inorganic salt and a solvent;

(b) adding vinylidene fluoride resins and/or N,N-diethylacrylamide to the mixture obtained in step (a) to produce an electrolyte composition; and (c) polymerizing the electrolyte composition.

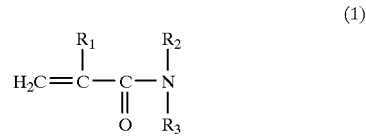

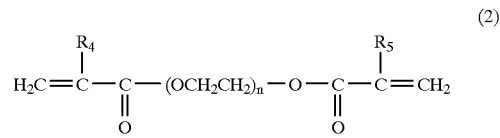

where $R_1$ is hydrogen or methyl group, and $R_2$ and $R_3$ are each independently one selected from the group consisting of hydrogen, methyl, ethyl, propyl, dialkylaminopropyl ($—C_3H_6N(R')_2$) and hydroxyethyl ($CH_2CH_2OH$) groups, and $R_4$ and $R_5$ are each independently hydrogen or methyl group, and n is an integer from 3 to 30, wherein R' is $C_1$~$C_5$ alkyl group.

Preferably, in the step (b), vinylidenefluoride resins that are dissolved in acetone are added.

In the step (c), the electrolyte composition can be polymerized by exposing to light of 350 nm or more for a time within the range of from 5~30 minutes or thermally polymerized at a temperature within the range of from 40~50° C.

In accordance with another object of the invention, there is provided a lithium secondary cell adopting the polymer solid electrolyte manufactured by the above method. The lithium secondary cell of the invention provides improvement in the mechanical intensity and ion conductivity.

DETAILED DESCRIPTION OF THE INVENTION

A polymer solid electrolyte of the present invention can comprise a polymer electrolyte medium and vinylidene fluoride resins and/or N,N-diethylacrylamide.

The polymer electrolyte medium of the invention typically comprises a polymer matrix, a polymerization initiator and an electrolyte solution including an inorganic salt and a solvent. The polymer matrix can be formed of a copolymer of a polymerizable monomer having an amide group at the side chain expressed by the formula (1) in an amount of from 10–15 wt %, based on the total weight of the polymer electrolyte medium, and a cross-linking agent having a repeating unit of oxyethylene expressed by the formula (2) in an amount of from 5–15 wt % based on the total weight of the polymer electrolyte medium. The polymer electrolyte medium contains from 0.5~1.5 wt % of polymerization initiator and from 68.5~84.5 wt % electrolyte solution based on the total weight of the polymer electrolyte medium. Here, the electrolyte solution can contain from 6~17 wt % of inorganic salt.

In the present invention, vinylidene fluoride resins and N,N-diethylacrylamide can be added to the polymer solid electrolyte, so that an organic electrolyte solution can be well absorbed within the network structure of the polymer matrix and the resulting polymer solid electrolyte has enhanced ion conductivity and the mechanical strength. In this context, since the vinylidene fluoride resins have excellent flexibility and organic solvent holding properties, the vinylidene fluoride resin can improve the mechanical strength and the ion conductivity of the electrolyte by being added to the polymer solid electrolyte. Also, the excellent organic solvent holding property of the N,N-diethylacrylamide markedly improves the ion conductivity of the electrolyte when the diethylacrylamide is added to the electrolyte.

Preferably, the polymer solid electrolyte contains from 1~9 wt % of vinylidene fluoride resins and from 1~5 wt % of diethylacrylamide, each weight percentage being based on the weight of the polymer electrolyte medium. Here, the optimal mechanical strength and ion conductivity of the electrolyte can be achieved when the aforementioned components are mixed in the above mixing range.

Hereinafter, each component of the polymer solid electrolyte according to the present invention and their properties will be described.

A gel type polymer solid electrolyte typically is composed of a polymer matrix of a network structure and an organic electrolyte solution absorbed in the space of the network structure. Here, the organic electrolyte solution includes an inorganic salt in a solvent.

The polymer matrix in the gel type polymer solid electrolyte is formed of a polymer having a network structure, which is obtained by copolymerizing a polymerizable monomer of the following formula (1) and a cross-linking agent of the following formula (2). If the polymer matrix is formed using this polymer, the mechanical strength as well as the flexibility and the elasticity are very excellent. Also, a great portion of the organic electrolyte solution can be contained in the space within the network structure, so that the ion conductivity of the electrolyte is improved.

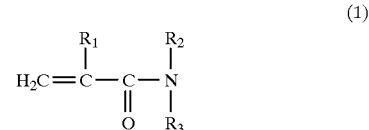

(1)

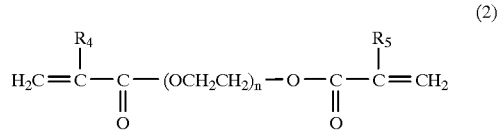

(2)

where $R_1$ is hydrogen or methyl group, and $R_2$ and $R_3$ are each independently one selected from the group consisting of hydrogen, methyl, ethyl, propyl, dialkylaminopropyl (—$C_3H_6N(R')_2$) and hydroxyethyl ($CH_2CH_2OH$) groups, and $R_4$ and $R_5$ are each independently hydrogen or methyl group, and n is an integer from 3 to 30, wherein R' is $C_1$~$C_5$ alkyl group.

Examples of suitable vinyl monomers shown in formula (1) include acrylamide, N,N-dimethylacrylamide, N,N-diethylacrylamide, N-isopropylacrylamide, N,N-dimethylaminopropylacrylamide, and N-acryloylmorpholine. Among these, N-isopropylacrylamide and N-acryloylmorpholine are preferred.

Also, the cross-linking agent of formula (2) coupling easily with a vinyl monomer shown in formula 1 has plasticity, and excellent conductivity of Li ions and is capable of coupling with a vinyl monomer easily. The cross-linking agent preferably includes polyethylene glycol diacrylate and polyethyleneglycol dimethacrylate.

A polymer having from 3~23 repeating units of oxyethylene is particularly preferred as the cross-linking agent of the present invention. If the number of the repeating units of the oxyethylene is below 3, the ion conductivity of the electrolyte is poor. On the contrary, if the number of the repeating unit of the oxyethylene is above 23, the miscibility with the polymerization monomer and the mechanical properties of the electrolyte are deteriorated.

Preferably, the polymerizable monomer of the formula (1) consisting of the polymer matrix and the cross-linking agent of the formula (2) are mixed with a weight ratio within the range of from 1:9~9:1.

The vinylidene fluoride resins of the invention preferably are polymers of vinylidene fluoride and include polyvinylidene fluoride or a copolymer of vinylidene fluoride and propylene hexafluoride. The mixing ratio of vinylidene fluoride and propylene hexafluoride is preferably within the range of from 80:20~90:10 based on weight, and the flexibility and organic solvent holding capacity preferably are in the range of the above mixing ratio.

In the copolymer of the vinylidene fluoride and the propylene hexafluoride, the propylene hexafluoride is believed to improve the solubility of the vinylidene fluoride with respect to the solvent. Thus, the solubility with respect to the solvent is poor when only vinylidene fluoride is used, while the copolymer of the vinylidene fluoride and propylene hexafluoride has excellent solubility with respect to the solvent.

Preferably, vinylidene fluoride resins in an organic solvent such as acetone are added to the electrolyte, to uniformly disperse the vinylidene fluoride resins within the electrolyte. If the vinylidene fluoride resins are added by being dissolved in the organic solvent such as acetone, the vinylidene fluoride resins preferably are copolymerized with a compound for the matrix of the electrolyte. Also, if the resins are added to the composition, the resins preferably are uniformly dispersed in the matrix to absorb the electrolyte solution, thereby increasing conductivity of the electrolyte. Also, the resins enforce the network structure of the polymer matrix, thereby increasing mechanical intensity.

In the present invention, the solvent of the electrolyte solution can include a non-aqueous solvent(first solvent) capable of being dissolved due to its high dielectric constant and polarity, and a second solvent capable of being contained within a matrix due to its excellent affinity to the polymer matrix.

As the first solvent, a solvent showing no phase separation phenomenon when mixed with the compound of formulas (1) and (2) is preferred. Particularly, it is preferable to select one from the group consisting of propylene carbonate, ethylene carbonate, γ-butyrolactone, 1,3-dioxolane, dimethoxyethane, dimethylcarbonate, diethylcarbonate, tetrahydrofuran (THF), dimethylsulfoxide and polyethyleneglycol dimethylether.

As the second solvent, a solvent having an amide group similar to the amide group in the polymerizable monomer of formula (1) is used. For example, the second solvent be any one of N,N-dimethylacetamide, N,N-diethylacetamide, N,N-dimethylformamide and N,N-diethylformamide.

When the first solvent is used together with the second solvent having excellent affinity to the polymer matrix, the electrolyte solution can be evenly distributed within the network structure of the polymer matrix and viscosity of the electrolyte solution is lowered, improving the ion conductivity of a support electrolyte salt being dissolved within the solvent.

Preferably, a mixing ratio of the first solvent and the second solvent is within the range of from 1:3~3:1 based on volume. If the mixing ratio of the second solvent with respect to the first solvent is above this range, the mechanical strength of the electrolyte is markedly decreased, so that the electrolyte is fragile during the cell assembly. Meanwhile, if the mixing ratio thereof is below the range, the ion conductivity of the electrolyte decreases and the electrolyte hardens.

An inorganic salt preferably is dissociated into a positive ion and a negative ion while being dissolved in the solvent. The dissociated ions move freely within the space of the polymer matrix to manifest the conductivity of the electrolyte. Here, the inorganic salt is selected according to the size of the dissociated ion within the solvent, dissociation property thereof, electrode material, and reactivity to the polymer matrix.

Preferably, the inorganic salt is an ionic lithium salt selected from the group consisting of lithium perchlorate ($LiClO_4$), lithium tetrafluoroborate ($LiBF_4$), lithium trifluoromethansulfonate ($LiCF_3SO_3$), lithium hexafluorophosphate ($LiPF_6$) and lithium bistrifluoromethansulfonylamide ($LiN(CF_3SO_2)_2$). Among these, lithium hexafluorophosphate ($LiPF_6$) is preferred since it can be dissociated very easily.

Any polymerization initiator can be used to initiate the polymerization. A preferred polymerization initiator of the present invention includes a thermal polymerization initiator such as azobisisobutyronitrile (AIBN) and benzoyl peroxide, acetyl peroxide and lauryl peroxide, and a photopolymerization initiator such as 2-hydroxy-2-methyl-1-phenylpropane, 1-hydroxycyclohexylphenylketone, 1-(4-isopropylphenyl)-2-hydroxy-2-methylpropane)-1-one, benzyldimethylketal, benzoinethylether.

Hereinafter, a method for manufacturing the polymer solid electrolyte according to the present invention will be described. Those skilled in the art will appreciate that the particular order of addition of reactants and polymerization, as well as the particular order of construction of an electrolyte cell can be varied, using the guidelines provided herein.

In a preferred embodiment, the polymerizable monomer of formula (1), the cross-linking agent of formula (2), the polymerization initiator, the organic solvent and the inorganic salt are mixed in a first step. Then, a vinylidene fluoride resin and/or diethylacrylamide is added to the above mixture to produce a composition for the polymer solid electrolyte.

After coating the composition on a glass substrate, the polymer solid electrolyte is obtained through polymerization. Here, the composition is polymerized in a photopolymerization method in which a light source having a wavelength of above 350 nm is irradiated for 5–30 minutes or in a thermal polymerization method in which the glass substrate deposited with the composition is maintained at the temperature range of 40~50° C.

Hereinafter, a lithium secondary cell adopting the polymer solid electrolyte according to a preferred embodiment of the present invention, and a manufacturing method therefor will be described.

First, one active material for lithium cathode, selected from the group consisting of lithium manganese oxide, lithium nickel oxide and lithium cobalt oxide, and a conductive agent are added to the composition for the polymer solid electrolyte including the polymerizable monomer of the formula (1), the cross-linking agent of the formula (2), the polymerization the electrolyte solution containing the inorganic salt and the solvent, vinylidene fluoride resins and/or N,N-diethylacrylamide, and then mixed well to form a reaction mixture. After coating the reaction mixture on a cathode current collector, the coated mixture is heated to form a composite cathode layer.

On the other hand, a mixture of carbon powder and the composition for the polymer solid electrolyte is coated on an anode current collector and then heated to form a composite anode layer.

After overlapping the composite cathode layer, a polymer solid electrolyte layer and the composite anode layer, the overlapped layers are combined by a thermal process or by applying a predetermined pressure, thereby completing a lithium secondary cell of the present invention. The skilled artisan is capable of making a lithium secondary cell using techniques known in the art.

Hereinafter, examples of the present invention will now be described, however, the present invention is not limited to the following examples.

EXAMPLES 1 THROUGH 7

Ethylene carbonate (Mitshubishi Chemical Co.) containing 1M $LiPF_6$ and N,N-dimethylacetamide (Kanto Chemical Co.) were mixed with 1:1 volumetric ratio to prepare an electrolyte solution. 15 wt % of N-isopropylacrylamide ("NIPAM", Kojin Co.) and 5 wt % of polyethyleneglycol dimethacrylate having N=23 ("23G", Shin Nakamura Co.), each weight percent based on the weight of the polymer electrolyte medium, were added to the electrolyte solution, and then benzoinethylether (BEE) (Nakalai Chemical Co.) was mixed thereinto. Then, polyvinylidene fluoride (PVDF) was placed in a small bottle and then dissolved with 3 ml acetone and subsequently mixed with the above mixture. Thereafter, N,N-diethylacrylamide (DEAA) was added to the resultant mixture to obtain the composition for the polymer solid electrolyte. The amounts of each component in the composition are shown in Table 1 for examples 1–7.

The above composition was coated on a glass substrate and then the resultant coating was subjected to ultraviolet rays for about 30 minutes to be polymerized, resulting in a gel type polymer solid electrolyte.

stainless steel disks, the ion conductivities were measured by an alternating current impedance method.

2) Mechanical Strength (a) The mechanical strength of the electrolyte itself:

A gel type film having a thickness of about 250 $\mu$m was cut into a square of 5×5 $cm^2$ and then wound around a stainless steel rod having a diameter of 5 mm. Then, the film was unwound from the rod. This process was repeated about 10 times, and then the appearance of the film was visually checked.

(b) The mechanical strength of composite type electrolyte:

40 wt % of electrode activation material composed of lithium manganese oxide and carbon black and 60 wt % of each composition for the polymer solid electrolytes obtained by Examples 1 through 12 were mixed, and then stirred for

TABLE 1

| examples | electrolyte solution (wt %) | NIPAM (wt %) | 23G (wt %) | BEE (wt %) | PVDF* (wt %) | DEAA· (wt %) | ion conductivity (S/cm) |
|---|---|---|---|---|---|---|---|
| 1 | 79 | 15 | 5 | 1 | 1 | 5 | 0.0034 |
| 2 | 79 | 15 | 5 | 1 | 3 | 4 | 0.0032 |
| 3 | 78 | 15 | 5 | 1 | 5 | 3 | 0.0035 |
| 4 | 77 | 15 | 5 | 1 | 7 | 2 | 0.0036 |
| 5 | 76 | 15 | 5 | 1 | 9 | 1 | 0.0035 |
| 6 | 70 | 15 | 5 | 1 | 12 | 0 | 0.0026 |
| 7 | 79 | 15 | 5 | 1 | 0 | 5 | 0.0025 |

*The contents of PDVP and DEAA are determined based on the total weight of NIPAM, 23G and BEE.

EXAMPLE 8

A gel type polymer solid electrolyte was produced by the same method as described in Example 1 except N-acryloylmorphorine was used instead of N-isopropylacrylamide.

EXAMPLE 9

A gel type polymer solid electrolyte was produced by the same method as described in Example 1 except the concentration of $LiPF_6$ was 0.5M.

EXAMPLE 10

A gel type polymer solid electrolyte was produced by the same method as described in Example 1 except the concentration of $LiPF_6$ was 1.5M.

EXAMPLE 11

A gel type polymer solid electrolyte was produced by the same method as described in Example 1 except ethylene carbonate and N,N-dimethylacetamide were mixed with a volumetric ratio of 1:2.

EXAMPLE 12

A gel type polymer solid electrolyte was produced by the same method as described in Example 1 except ethylene carbonate and N,N-dimethylacetamide was mixed with a volumetric ratio of 2:1.

Performance tests of the polymer solid electrolytes obtained by the above examples were conducted by the following methods.

1) Ion Conductivity

A gel type film having a diameter of 13 mm was prepared from respective polymer solid electrolytes obtained through Examples 1 to 12. After putting the film between two 2 hours using a mechanical stirrer. Then, the resultant mixture was coated on a glass substrate to a thickness of about 250 $\mu$m and then polymerized by irradiating a chemical lamp at 40° C. for 30 minutes.

After separating the composite electrode material from the glass substrate, a gel type film having a thickness of about 250 $\mu$m was cut into a square of 5×5 $cm^2$. The obtained sample was wound around a stainless steel rod having a diameter of 5 mm diameter. Then, the film was unwound from the rod. This process was repeated 10 times, and then the film was observed visually.

The visual appearance of the film was evaluated into one of three levels: excellent, good or poor. The film was evaluated as "excellent" when the film was in a state in which no defects were visually detected in the gel type film. The film was evaluated as "good" when it was in a state in which very trivial defects were detected which would not have an adverse effect in usage. The film was evaluated as "poor" when it was in a state in which defects were visually detected.

3) Leakage of Electrolyte Solution

A filter paper was attached to the gel type film for a predetermined time. Then, it was observed whether the electrolyte solution leaks or not.

The results of the above performance tests with respect to Examples 3 and 8–12 are shown in Table 2.

TABLE 2

| | | mechanical strength | | leakage of |
|---|---|---|---|---|
| examples | ion conductivity (S/cm) | electrolyte itself | composite type electrolyte | electrolyte solution |
| 3 | 3.5 × $10^{-3}$ | excellent | excellent | X |
| 8 | 3.2 × $10^{-3}$ | excellent | excellent | X |
| 9 | 3.32 × $10^{-3}$ | excellent | excellent | X |

TABLE 2-continued

| examples | ion conductivity (S/cm) | mechanical strength electrolyte itself | composite type electrolyte | leakage of electrolyte solution |
|---|---|---|---|---|
| 10 | $3.16 \times 10^{-3}$ | excellent | excellent | X |
| 11 | $2.85 \times 10^{-3}$ | excellent | excellent | X |
| 12 | $2.66 \times 10^{-3}$ | excellent | excellent | X |

As shown in Table 2, the ion conductivities of the polymer electrolyte produced by Examples 3 and 8 through 12 were improved. Also, the mechanical strength thereof was excellent and the leakage of the electrolyte solution was not detected. That is, the electrolyte solution holding capacity of each polymer solid electrolyte also was excellent.

As described above, the polymer solid electrolyte was a gel type containing an organic electrolyte solution having high ion conductivity within the polymer matrix. Also, the electrolyte solution did not leak from the polymer solid electrolyte, and the polymer solid electrolyte could be easily processed into a desired shape due to its good flexibility.

Also, when a cell is manufactured using the polymer solid electrolyte, deterioration of the cell which is caused by a pressing operation and thermal changes in the cell manufacturing process is minimized, providing an excellent lithium secondary cell having excellent mechanical and electrochemical properties.

The invention has been described in detail by reference to particularly preferred embodiments and examples. Those skilled in the art will appreciate, however, that various modifications can be made to the present invention without significantly departing from the spirit and scope thereof.

What is claimed is:

1. A polymer solid electrolyte comprising:
   a polymer electrolyte medium;
   at least one vinylidene fluoride resin and/or at least one N,N-diethylacrylamide,
   wherein the polymer electrolyte medium has a polymer matrix comprised of:
   a copolymer of a polymerizable monomer expressed by the formula (1) and a cross-linking agent expressed by the formula (2);
   a polymerization initiator; and
   an electrolyte solution containing an inorganic salt and a solvent

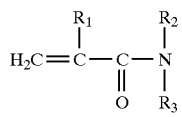
(1)

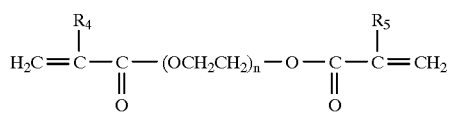
(2)

where $R_1$ is hydrogen or methyl group, and $R_2$ and $R_3$ are each independently one selected from the group consisting of hydrogen, methyl, ethyl, propyl, dialkylaminopropyl ($-C_3H_6N(R')_2$) and hydroxyethyl ($CH_2CH_2OH$) groups, and $R_4$ and $R_5$ are each independently hydrogen or methyl group, and n is an integer from 3 to 30, wherein R' is $C_1$~$C_5$ alkyl group.

2. A polymer solid electrolyte as claimed in claim 1, wherein the polymer solid electrolyte comprises the polymer electrolyte medium, at least one vinylidene fluoride resin and at least one N,N-diethylacrylamide.

3. A polymer solid electrolyte as claimed in claim 1, wherein the vinylidene fluoride resin is used in an amount of from 1~9 wt % based on the weight of the polymer electrolyte medium.

4. A polymer solid electrolyte as claimed in claim 1, wherein the N,N-diethylacrylamide is used in an amount of from 1~5 wt % based on the weight of the polymer electrolyte medium.

5. A polymer solid electrolyte as claimed in claim 1, wherein the vinylidene fluoride resin is polyvinylidene fluoride.

6. A polymer solid electrolyte as claimed in claim 1, wherein the vinylidene fluoride resins is a copolymer of vinylidene fluoride and propylene hexafluoride.

7. A polymer solid electrolyte as claimed in claim 6, wherein the mixing ratio of vinylidene fluoride and propylene hexafluoride is within the range of from 80:20~90:10 based on weight.

8. A polymer solid electrolyte as claimed in claim 1, wherein the solvent is a mixture of a non-aqueous solvent having a high dielectric constant and a solvent having an amide group.

9. A polymer solid electrolyte as claimed in claim 8, wherein the mixing ratio of the non-aqueous solvent and the solvent having an amide group is within the range of from 1:3~3:1 based on volume.

10. A polymer solid electrolyte as claimed in claim 8, wherein the non-aqueous solvent is at least one selected from the group consisting of propylene carbonate, ethylene carbonate, γ-butyrolactone, 1,3-dioxolane, dimethoxyethane, dimethylcarbonate, diethylcarbonate, tetrahydrofuran (THF), dimethylsulfoxide and polyethyleneglycol dimethylether.

11. A polymer solid electrolyte as claimed in claim 8, wherein the solvent having the amide group is at least one selected from the group consisting of N,N-dimethylacetamide, N,N-diethylacetamide, N,N-dimethylformamide and N,N-diethylformamide.

12. A polymer solid electrolyte as claimed in claim 1, wherein the inorganic salt is at least one selected from the group consisting of lithium perchlorate ($LiClO_4$), lithium tetrafluoroborate ($LiBF_4$), lithium trifluoromethansulfonate ($LiCF_3SO_3$), lithium hexafluorophosphate ($LiPF_6$) and lithium bistrifluoromethansulfonylamide ($LiN(CF_3SO_2)_2$).

13. A polymer solid electrolyte as claimed in claim 1, wherein the polymerization initiator is a photopolymerization initiator selected from the group consisting of 2-hydroxy-2-methyl-1-phenylpropane, 1-hydroxycyclohexylphenylketone, 1-(4-isopropylphenyl)-2-hydroxy-2-methylpropane)-1-one, benzyldimethylketal and benzoinethylether, or a thermal polymerization initiator selected from the group consisting of azobisisobutyronitrile (AIBN), azobis(2,4-dimethylvaleronitrile) and azobis(4-methoxy-2,4-dimethylvaleronitrile).

14. A polymer solid electrolyte as claimed in claim 1, wherein the polymerizable monomer expressed by the formula (1) is at least one selected from the group consisting of acrylamide, N,N-dimethylacrylamide, N,N-diethylacrylamide, N-isopropylacrylamide, N,N-dimethylaminopropylacrylamide, and N-acryloylmorpholine.

15. A polymer solid electrolyte as claimed in claim 1, wherein the crosslinking agent expressed by the formula (2)

is selected from polyethyleneglycol diacrylate or polyethyleneglycol dimethacrylate.

16. A polymer solid electrolyte as claimed in claim 1, wherein the mixing ratio of the polymerizable monomer expressed by the formula (1) and the cross-linking agent expressed by the formula (2) is within the range of from 1:9~9:1 based on weight.

17. A polymer solid electrolyte as claimed in claim 1, wherein the content of the polymerizable monomer expressed by the formula (1) is within the range of from 10~15 wt % based on the weight of the polymer electrolyte medium.

18. A polymer solid electrolyte as claimed in claim 1, wherein the content of the cross-linking agent expressed by the formula (2) is within the range of from 5~15 wt % based on the weight of the polymer electrolyte medium.

19. A polymer solid electrolyte as claimed in claim 1, wherein the content of the polymerization initiator is within the range of from 0.5~1.5 wt % based on the weight of the polymer electrolyte medium.

20. A polymer solid electrolyte as claimed in claim 1, wherein the content of the electrolyte solution is within the range of from 68.5~84.5 wt % based on the weight of the polymer electrolyte medium.

21. A polymer solid electrolyte as claimed in claim 1, wherein the content of the inorganic salt is within the range of from 6~17 wt % based on the weight of the electrolyte solution.

22. A method for manufacturing a polymer solid electrolyte as claimed in claim 1, comprising the steps of:

(a) mixing the polymerizable monomer expressed by the formula (1), the cross-linking agent expressed by the formula (2), the polymerization initiator and the electrolyte solution containing an inorganic salt and a solvent to provide a mixture;

(b) adding to that mixture at least one vinylidene fluoride resin and/or the at least one N,N-diethylacrylamide to produce an electrolyte composition; and (c) polymerizing the electrolyte composition

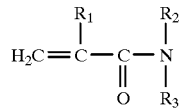
(1)

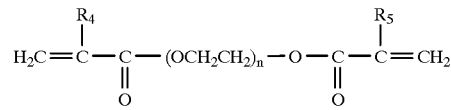
(2)

where $R_1$ is hydrogen or methyl group, and $R_2$ and $R_3$ are each independently one selected from the group consisting of hydrogen, methyl, ethyl, propyl, dialkylaminopropyl ($-C_3H_6N(R')_2$) and hydroxyethyl ($CH_2CH_2OH$) groups, and $R_4$ and $R_5$ are each independently hydrogen or methyl group, and n is an integer from 3 to 30, wherein R' is $C_1$~$C_5$ alkyl group.

23. A method for manufacturing a polymer solid electrolyte as claimed in claim 22, wherein the at least one vinylidene fluoride resin is added in step (b) after being dissolved in acetone.

24. A lithium secondary cell comprising the polymer solid electrolyte as claimed in claim 1.

* * * * *

UNITED STATES PATENT AND TRADEMARK OFFICE
CERTIFICATE OF CORRECTION

PATENT NO.   : 5,965,300
DATED        : October 12, 1999
INVENTOR(S)  : Doo-yeon LEE et al.

It is certified that error appears in the above-identified patent and that said Letters Patent is hereby corrected as shown below:

Please correct the Assignee to read [73] –Samsung Electronics Co., Ltd. --.

Signed and Sealed this

Twenty-fourth Day of October, 2000

Attest:

Q. TODD DICKINSON

Attesting Officer

Director of Patents and Trademarks